United States Patent [19]

Goto et al.

[11] 4,151,052

[45] Apr. 24, 1979

[54] PROCESS FOR PRODUCING SODIUM HYPOCHLORITE

[75] Inventors: Nobutaka Goto; Hiroshi Daidoji, both of Tokyo, Japan

[73] Assignee: Chlorine Engineers Corp., Ltd., Tokyo, Japan

[21] Appl. No.: 875,065

[22] Filed: Feb. 3, 1978

[30] Foreign Application Priority Data

Feb. 18, 1977 [JP] Japan .................................. 52-16088
Feb. 18, 1977 [JP] Japan .................................. 52-16089

[51] Int. Cl.² .................................................. C25B 1/26
[52] U.S. Cl. ...................................... 204/95; 204/241; 204/269
[58] Field of Search .......................................... 204/95

[56] References Cited

U.S. PATENT DOCUMENTS

| | | | |
|---|---|---|---|
| 2,511,516 | 6/1950 | Schumacher | 204/95 |
| 3,819,504 | 6/1974 | Bennett | 204/284 |
| 3,849,281 | 11/1974 | Bennett et al. | 204/95 |
| 3,884,791 | 5/1975 | Raetzsch et al. | 204/95 |
| 3,917,518 | 11/1975 | Franks et al. | 204/95 |

*Primary Examiner*—T. Tung
*Attorney, Agent, or Firm*—Sughrue, Rothwell, Mion, Zinn and Macpeak

[57] ABSTRACT

A process for producing sodium hypochlorite comprising electrolyzing an aqueous solution of sodium chloride as an electrolyte solution in a non-diaphragm electrolytic cell comprising at least one unit cell in which the ratio of the actual area of the anode to the actual area of the cathode is at least about 1.5: 1. In a preferred embodiment higher concentrations of sodium hypochlorite can be attained by performing the electrolysis while cooling the electrolyte solution to about 50° C. or less.

15 Claims, 9 Drawing Figures

PROCESS FOR PRODUCING SODIUM HYPOCHLORITE

BACKGROUND OF THE INVENTION

1. Field of the Invention

This invention relates to a process for producing sodium hypochlorite. More specifically, it relates to a process for producing sodium hypochlorite which is useful for oxidizing treatment in sterilization, decolorization, deodorization, iron elimination and manganese elimination of river water, city water, sewage water, waste water, etc. and for other purposes.

2. Description of the Prior Art

Generally, sodium hypochlorite is produced by reacting a concentrated sodium hydroxide solution with chlorine gas, and commercially available grades have an available chlorine concentration of about 12% by weight. Commercially available aqueous solutions of sodium hypochloride are affected by temperature, impurities, sunlight, etc. during storage and undergo decomposition or a chemical reaction, thus causing a reduction in the concentration of available chlorine. The reduction in the available chlorine concentration is especially outstanding in the summertime, and generally about 25% of the available chlorine is lost.

In an attempt to avoid this reduction in available chlorine concentration, a method can be employed which involves providing a non-diaphragm electrolytic cell at a site adjacent a water treatment facility, and feeding an aqueous solution of sodium hypochlorite formed by electrolysis of an aqueous solution of sodium chloride directly to the adjacent treatment facility. In this case, too, there are causes which reduce the amount of available chlorine in the production of an aqueous solution of sodium hypochlorite.

The amount of available chlorine represents the amount of chlorine in the aqueous solution of sodium hypochlorite, and is generally expressed by the following equation.

Amount of Available Chlorine (g/l) = 2 × (chlorine in NaClO)

One cause of the reduction in the amount of available chlorine is that hypochlorite ion is electrochemically reduced at the cathode according to the following reactions.

$$HClO + H^+ + 2e \rightarrow HCl + OH^- \quad (1)$$

$$ClO^- + 2H^+ + 2e \rightarrow HCl + OH^- \quad (2)$$

$$(ClO^- + H^+ + 2e \rightarrow Cl^- + OH^-)$$

Another cause for the reduction of the amount of available chlorine is the formation of sodium chlorate in the solution by the reaction (3) shown below.

$$ClO^- + 2HClO \rightarrow ClO_3^- + 2HCl \quad (3)$$

Because of these causes, the ratio of effective utilization of the sodium chloride and the current efficiency are poor in conventional non-diaphragm electrolytic cells for production of sodium hypochlorhite, and the cost of operation is very high.

Further, since the rate of reaction (3) is expressed by the equation $d[ClO_3^-]/dt = k[ClO^-][HClO]^2$, the amount of chlorate ion formed increases with higher concentrations of available chlorine and higher temperatures. Hence, the current efficiency and the ratio of utilization of the starting salt both decrease even more in the non-diaphragm electrolytic cell for producing sodium hypochlorite.

U.S. Pat. No. 3,917,518 discloses a process for the production of hypochlorite solutions by electrolysis of aqueous chloride solutions. The effect of temperature on the formation of sodium chlorate appears to be disclosed but the effect of the specific ratio of the actual area of the anode to the actual area of the cathode is not disclosed not taught.

U.S. Pat. Nos. 3,849,281 and 3,819,504 are directed to an electrolytic cell for the production of alkali metal hypochlorites, specifically using a plurality of unit cells in U.S. Pat. No. 3,849,281, with particular electrode constructions. In neither of these two U.S. patents is there disclosure that the surface area of the anode to the surface area of the cathode should have a particular relationship in order to achieve improved current efficiencies.

SUMMARY OF THE INVENTION

Accordingly, an object of this invention is to produce sodium hypochlorite at low costs and good efficiency. The invention provides a process for producing sodium hypochlorite which can inhibit reactions (1) to (3) above, maintain the concentration of sodium hypochlorite and the current efficiency at high levels, and effectively utilize the starting salt.

According to one embodiment of the present invention, reactions (1) and (2) can be inhibited by a process for producing sodium hypochlorite, which comprises electrolyzing an aqueous solution of sodium chloride in a non-diaphragm electrolytic cell comprising at least one unit cell, wherein the ratio of the actual area of the anode to the actual area of the cathode in the electrolytic cell is at least about 1.5:1.

According to another embodiment of the present invention, the reaction (3) can be inhibited by a process for producing sodium hypochlorite which comprises electrolyzing an aqueous solution of sodium chloride in a non-diaphragm electrolytic cell as described in the first embodiment and further cooling the electrolyte solution, e.g., using at least one cooling means provided in or between the unit cells, to maintain the electrolyte solution at a temperature of about 50° C. or less, preferably 5° to 45° C. This embodiment of this invention permits a more economical operation of the electrolytic cell.

DETAILED DESCRIPTION OF THE INVENTION

The present invention was accomplished on the basis of the findings and investigations described hereinbelow.

The relationship of the ratio between the actual area of the anode and the actual area of the cathode to the current efficiency based on the concentration of available chlorine was examined in order to discover electrolysis conditions which inhibited the cathodic reduction reactions (1) and (2) above and maintain the concentration of sodium hypochlorite and the current efficiency based on the concentration of available chlorine. This examination led to the discovery that the current efficiency increases with a higher ratio of the actual area of the anode to the actual area of the cathode, and in order to perform electrolysis at current efficiencies which are sufficient from an economical viewpoint, the actual area of the anode should be preferably at least about 1.5 times the actual area of the cathode.

Figure 1:
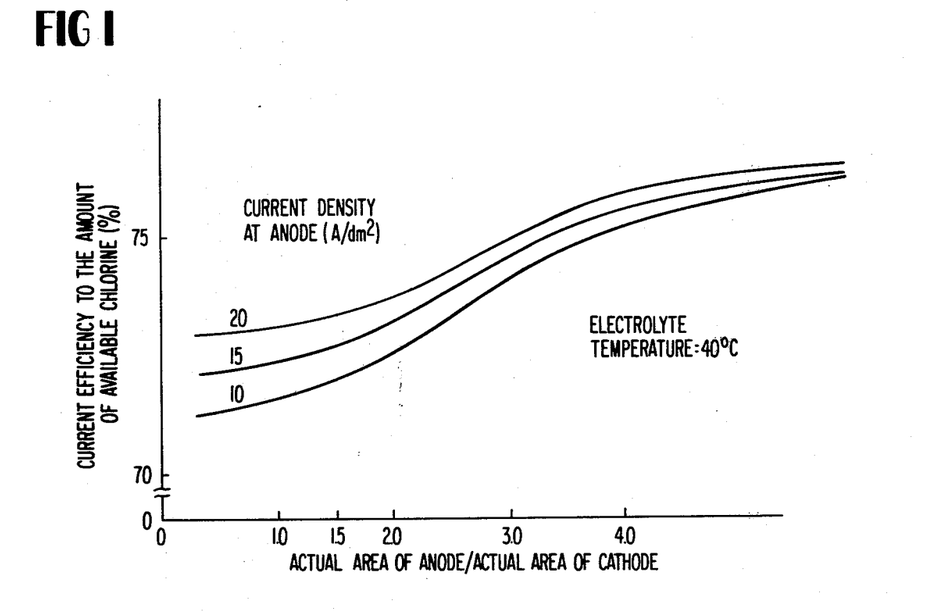
FIG. 1 is a graphical presentation of the relationship between the current efficiency and the ratio of the actual area of the anode to the actual area of the cathode.

Specifically, a titanium anode coated with a platinum-group metal oxide and a titanium cathode were used, and current efficiency was evaluated by changing the ratio of the actual area of the anode to the actual area of the cathode while maintaining the current density at the anode constant. The relationship as shown in FIG. 1 (the temperature of the electrolyte solution was 40° C.) was observed. The current efficiency varies depending on the type of anode used, but the curve representing the relationship between the current efficiency and the ratio of the actual area of the anode to the actual area of the cathode shows the same tendency as in FIG. 1 regardless of the type of the anode used. If the actual area ratio shown above is at least about 1.5:1, the current efficiency is economically feasible regardless of the type of the anode used.

The reason is because the rate-determining step of the cathodic reducing reaction of sodium hypochlorite is based on diffusion, the current losses due to cathodic reduction reactions (1) and (2) are reduced with smaller actual areas of the cathode than that of the anode.

Figure 2:
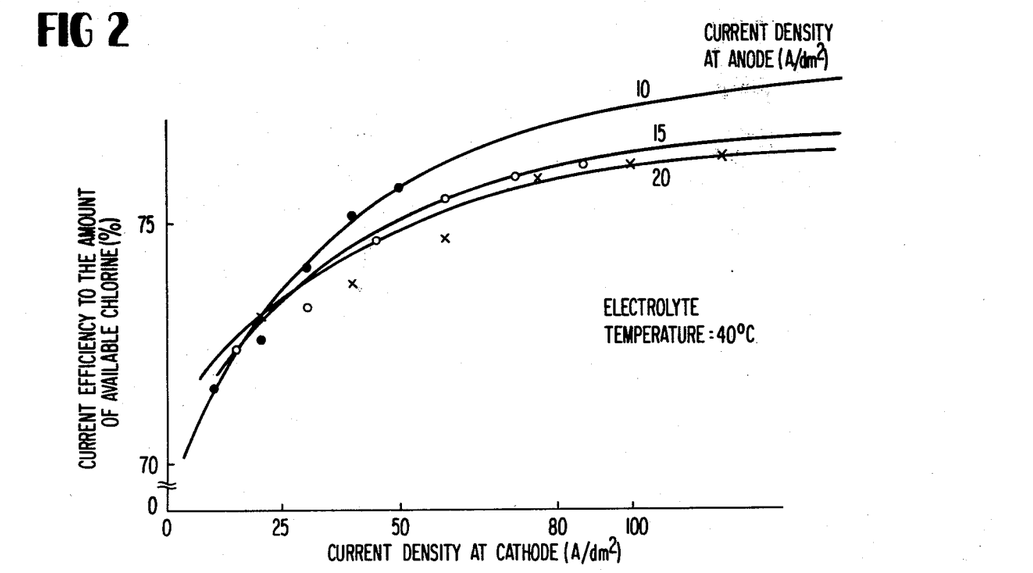
FIG. 2 is a graphical presentation showing the relationship between the effective average current density at the cathode and the current efficiency.

The relationship between the effective average current density at the cathode and the current efficiency was also investigated, and the relationship shown in FIG. 2 (the temperature of the electrolyte solution was 40° C.) was observed. If the actual area of the cathode is smaller than that of the anode, the effective average current density at the cathode increases. The tendency shown in FIG. 2 for the current efficiency based on the concentration of available chlorine to increase if the effective average current density at the cathode is increased while maintaining the current density at the anode constant is the same as the tendency shown in FIG. 1. FIG. 2 also shows that it is desirable to adjust the effective average current density at the cathode to at least about 20 A/dm$^2$, preferably 20 to 80 A/dm$^2$. In other words, in an electrolytic cell of a structure in which the actual area of the anode is at least about 1.5 times the actual area of the cathode, if the effective average current density at the cathode is adjusted to about 20 to 80 A/dm$^2$, sodium hypochlorite can be obtained with a better current efficiency.

Desirably, the effective average current density at the anode is not more than about 60 A/dm$^2$ and, from the viewpoint of the durability of the anode, preferably not more than about 20 A/dm$^2$.

The concentration of the starting salt solution and the temperature of the electrolyte solution are factors which will affect the current efficiency in the production of sodium hypochlorite by electrolyzing an aqueous solution of sodium chloride in a non-diaphragm electrolytic cell. In the first embodiment of this invention, the concentration of the starting sodium chloride aqueous solution is preferably about 20 g/liter to about 50 g/liter in order to produce an aqueous solution of sodium hypochlorite having an available chlorine concentration of at least about 3 g/liter, preferably at least 6 g/liter, required for economical operation and to achieve a high current efficiency. The pH of the starting aqueous sodium chloride solution will be about 5 to about 10 and a suitable temperature for the starting aqueous sodium chloride solution will be a temperature above about 5° C., preferably 15° to 45° C.

A suitable temperature for electrolysis in the first embodiment of the process of this invention can range from about 5° to less than about 60° C. A suitable voltage which can be used is about 2.3 to about 10 volts, preferably 4 to 5 volts and suitable current densities can be as follows: cathode current densities of about 20 to about 80 A/dm$^2$, preferably 20 to 40 A/dm$^2$, as described above, and anode current densities of about 4 to 60 A/dm$^2$, preferably 10 to 20 A/dm$^2$.

In the conventional process for producing sodium hypochlorite, the electrolysis is performed at a current density of 5 to 20 A/dm$^2$ both at the anode and the cathode on considering the consumption of the electrodes, the increase in the temperature of the electrolyte solution, and the current efficiency of the anode.

Usually, it is commonly known that since the anode material is 5 to 10 times more costly than the cathode material, the current density at the anode is higher than the current density at the cathode to save on the cost of the electrode materials, and the current density between the electrodes is reduced to decrease the voltage.

Therefore, in view of the above, studies were also made on increasing the current efficiency by adjusting the temperature of the electrolyte solution. Specifically, investigations were made to discover a suitable temperature range for the electrolyte solution to inhibit reaction (3), and examinations on the effect of temperature on the formation of sodium hypochlorite in a non-diaphragm electrolytic cell were made. This work led to the discovery of the relationship shown in FIG. 3.

Figure 3:
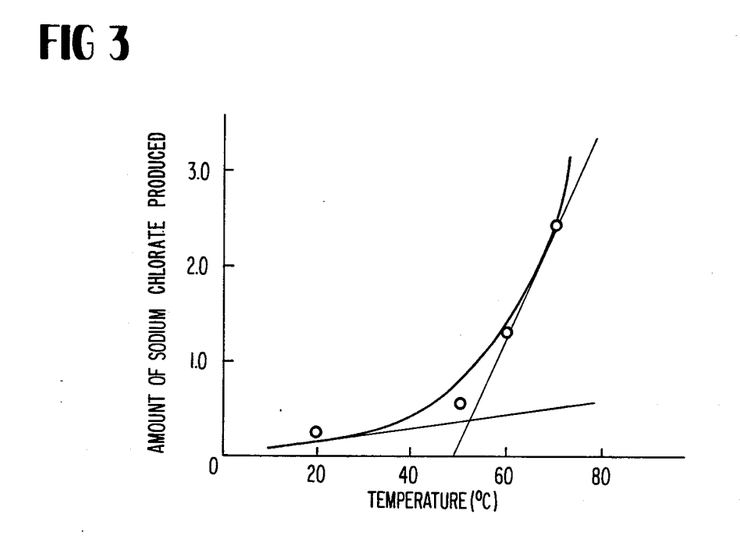
FIG. 3 is a graphical presentation of the relationship between the amount of sodium chlorate produced and the temperature of the electrolyte.

FIG. 3 shows that the amount of sodium chlorate which reduces the current efficiency and the ratio of effective utilization of the sodium chloride increases as the temperature increases, and because there is an inflection point near 50° C., the amount of sodium chlorate varies abruptly at more than 50° C. The concentration of available chlorine formed needs to be decreased in order to increase the current efficiency and the ratio of effective utilization of the starting sodium chloride in the production of sodium hypochlorite in a non-diaphragm electrolytic cell. In order to increase the concentration of available chlorine yet prevent a reduction in the current efficiency and the ratio of effective utilization of the starting sodium chloride and, thus to conduct the operation economically, the residence time of the electrolyte containing sodium chloride in the electrolytic cell must be increased. This causes a marked increase in the temperature, and the amount of sodium chlorate formed by reaction (3) increases. The increase in the temperature should therefore be affirmatively inhibited.

Furthermore, the current density at the cathode, as described above, is desirably adjusted to at least about 20 A/dm$^2$ in order to increase the current efficiency based on the concentration of available chlorine formed and to inhibit the cathodic reduction reaction of hypochlorite ion. However, the temperature of the electrolyte solution increases as the current density increases. When electrolysis is carried out at a cathode current density of at least about 20 A/dm$^2$ in an attempt to economically produce sodium hypochlorite having an available chlorine concentration of at least about 3 g/liter, the temperature of the electrolyte solution markedly increases. It is still necessary to inhibit the increase in the temperature of the electrolyte solution.

By maintaining the temperature of the electrolyte solution at not more than about 50° C., preferably not more than 45° C., by affirmative cooling, the second embodiment of the process of this invention, which can be used to produce sodium hypochlorite economically without a marked increase in power consumption and the amount of the starting salt consumed, has been accomplished.

When the life of the electrodes or the electric resistance is considered, the temperature of the electrolyte solution is preferably about 5° C. or higher.

In the second embodiment of the process of this invention, with the exception of the temperature of about 50° C. or less at which the electrolyte is controlled, the same processing conditions as described hereinbefore for the first embodiment of this invention can be used.

In the unit cell or unit cells used in the embodiments of this invention, the cell walls and partitions can be made of corrosion resistant and electrically insulating materials, such as polyvinyl chloride, polypropylene, acrylic resins, or polycarbonate resins. Suitable anode materials include titanium coated with a platinum group metal, titanium coated with a platinum group metal oxide, etc., and suitable cathode materials include iron, nickel, titanium, stainless steel, etc. The size of the anode and the cathode can be varied, as desired, as long as the ratio of the actual area of the anode to the actual area of the cathode is about 1.5:1 or greater. There is no limitation on how large this ratio can be, but in general it will range up to above 5:1. A preferred ratio of the actual area of the anode to the actual area of the cathode is 1.5:1 to 3:1. As will be recognized by one skilled in the art, the unit cell will contain one or more spacers preventing electrode contact and suitable electrode supports. The anode and the cathode can have any shape in the embodiments of this invention, e.g., such can be a flat plate electrode, a rod-type electrode, a mesh-type electrode, etc. The size of the actual surface area of both the anode and the cathode is calculated from the shapes of the anode and the cathode employed. The ratio of the actual area of the anode to the actual area of the cathode of at least about 1.5:1 is thus obtained by adjusting the size of the actual surface area of the anode and the size of the actual surface area of the cathode which is in contact with the sodium chloride aqueous solution electrolyte.

Thus, according to the present invention, reactions (1) and (2) above are inhibited, and by adjusting the temperature of the electrolyte solution to about 50° C. or less, reaction (3) above of forming sodium chlorate is inhibited, thus making it possible to maintain the concentration of sodium hypochlorite at a higher level.

The first embodiment of the invention permits an inhibition of the two reactions (1) and (2), and the second embodiment of the invention permits an inhibition of the three reactions (1), (2) and (3). Hence, the concentration of sodium hypochlorite can be maintained high, and an aqueous solution of sodium hypochlorite can be produced at low costs and with good efficiency. Hence, the present invention is especially suitable for production of sodium hypochlorite used for water treatment, etc.

An especially effective cooling of the electrolyte solution in the second embodiment of this invention can be achieved by providing at least one cooling means in or between the unit cells which make up the electrolytic cell, and allowing the electrolyte solution to pass through the cooling means.

Specific methods available to cool the electrolyte solution using cooling means are shown in FIGS. 4 to 9 of the accompanying drawings.

FIGS. 4 to 9 are views specifically illustrating the process of this invention.

Figure 4:
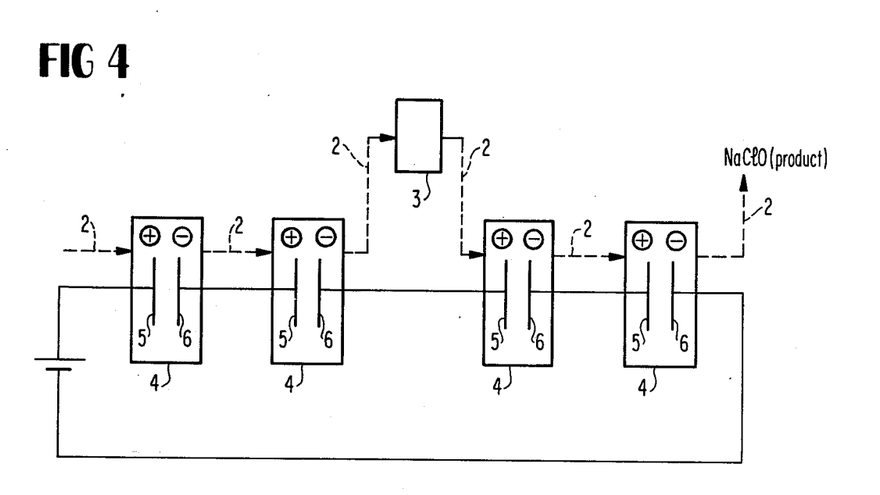
FIGS. 4 to 9 are views illustrating the second embodiment of the process of this invention.
Figure 5:
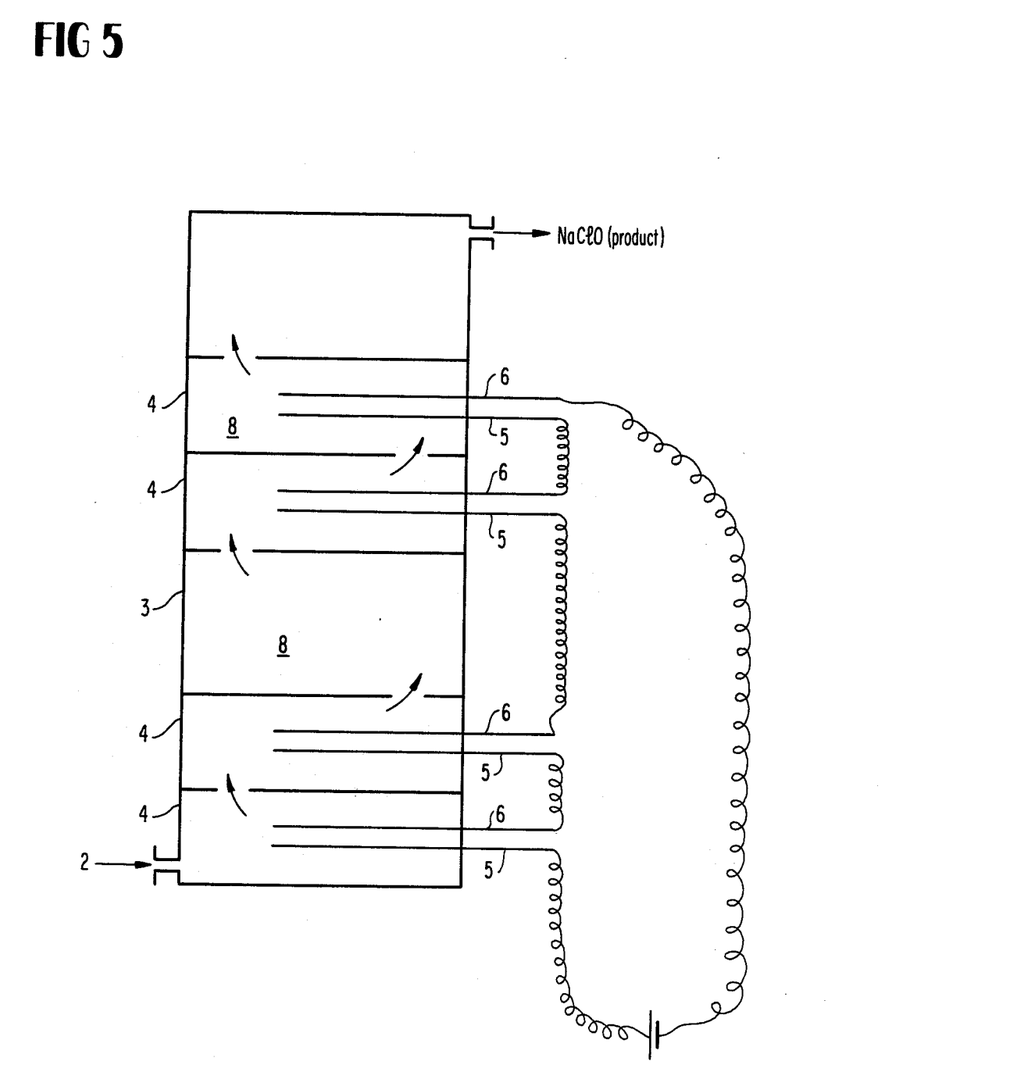
Figure 6:
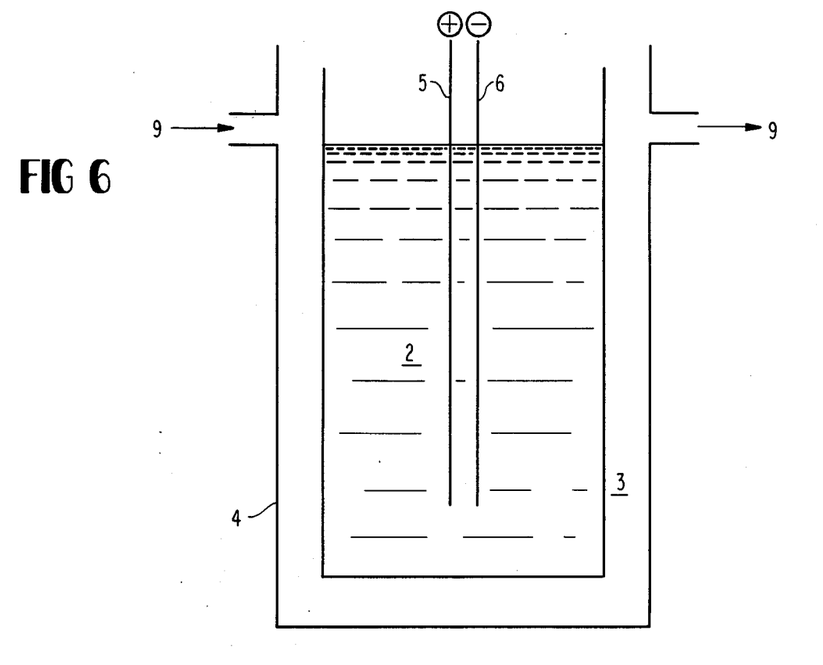
Figure 7:
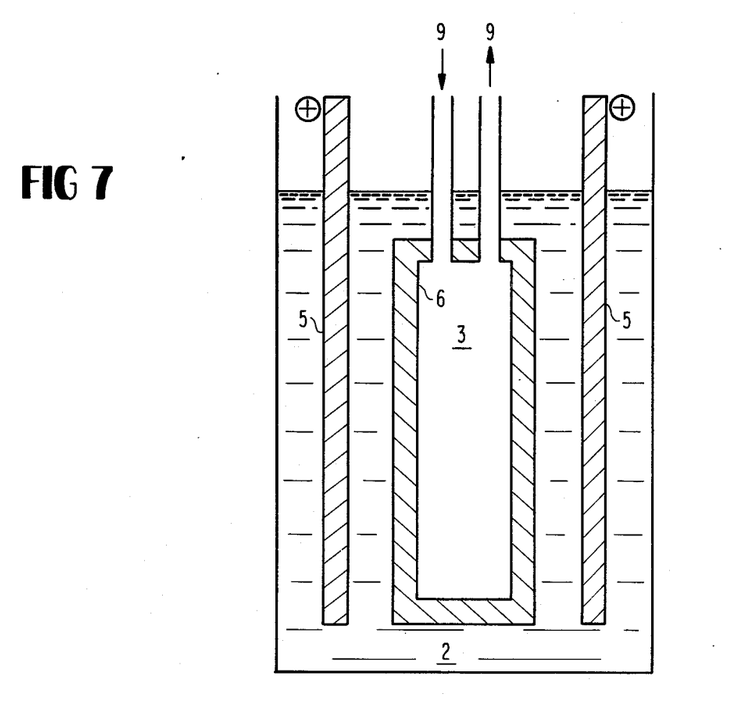

FIGS. 4 and 5 illustrate a method wherein the electrolyte solution 2 is electrolyzed while it is cooled by passing the electrolyte solution 2 through a cooling device 3 provided between unit cells 4 of the electrolytic cell. In particular, FIG. 5 shows an embodiment suitable for preventing leakage of current in which cooling device 3 and unit cells 4 partitioned by partitioning plates 8 are formed in an integral unitary structure. FIG. 6 shows an embodiment in which cooling device 3 is provided along the inside surface of unit cell 4 for cooling electrolyte solution 2. FIG. 7 shows a means for cooling the electrolyte solution by cooling device 3 integrated with cathode 6, with cooling water or a cooling gas 9 being introduced into the inside of cathode 6.

In FIGS. 4 to 7, reference numeral 5 represents an anode, and reference numeral 6 represents a cathode.

Figure 8:
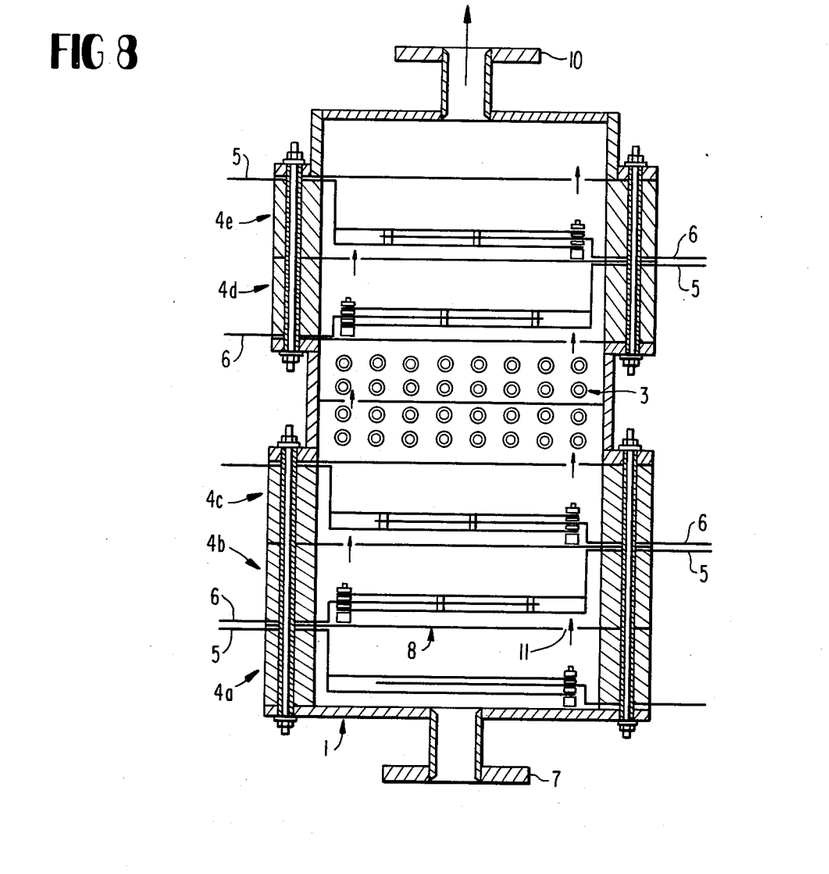

FIG. 8 illustrates this embodiment more specifically. In FIG. 8, electrolytic cell 1 comprises a plurality of unit cells 4 partitioned by partitioning plates 8. Lowermost unit cell 4a is directly connected to an electrolyte solution inlet 7, and uppermost unit cell 4e is connected to an electrolyte solution outlet 10. Each partitioning plate 8 has an opening 11 for passage of the electrolyte solution, and through the opening 11, the electrolyte solution rises. Cooling device 3 is provided between unit cells 4c and 4d. When the electrolyte solution rises through the unit cells, the electrolyte solution passes through the cooling device between the unit cells 4c and 4d, and the temperature of the electrolyte solution is thus maintained at about 50° C. or less.

Figure 9:
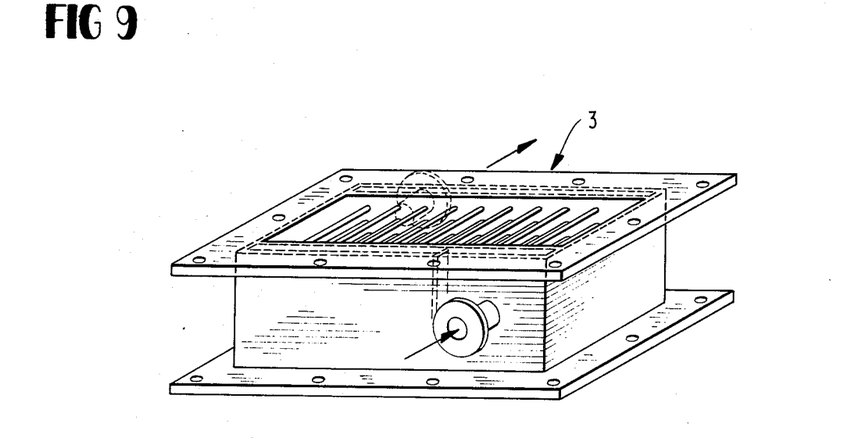

The structure of the cooling device 3 used in the above embodiments is not particularly restricted. For example, as shown in FIG. 9 which is a perspective view of a cooling device, the structure may be one in which a cooling medium is passed through numerous pipes. In order to prevent a leakage of current to the cooling means the cooling device is preferably made of an electrically insulating synthetic resin such as polyvinyl chloride or polypropylene. The cooling medium can be a liquid such as water brine, etc. or a gas such as Freon gas, ethylene gas, gaseous ammonia, etc. Heat in the eletrolyte is thus removed therefrom by transfer to the cooling medium.

In FIG. 8, the anode 5 and the cathode 6 are disposed horizontally, but the structure of the electrolytic cell used in this embodiment is not limited to the structure shown in FIG. 8. Furthermore, in FIG. 8, the electrolytic cell has a structure in which the unit cells are superimposed vertically. However, the electrolytic cell may have a structure in which the unit cells are disposed in series laterally. The number of unit cells is not limited in particular, and the number of cooling devices, also can be increased or decreased depending on the number of unit cells present. In general, from 3 to 15 unit cells, more generally 5 to 10 unit cells, are employed in operation.

Since the present embodiment inhibits the formation of sodium chlorate due to reaction (3) in the electrolyte solution and enables a high concentration of sodium hypochlorite (the concentration of available chlorine) to be maintained, it is possible to maintain a high current efficiency and to utilize the starting sodium chloride effectively. Thus, sodium hypochlorite can be produced economically.

The following Examples are given to illustrate the present invention in greater detail. Unless otherwise indicated herein, all parts, percents, ratios and the like are by weight.

EXAMPLE 1

An aqueous sodium chloride solution was electrolyzed under the following conditions at varying cathode current densities using a non-diaphragm electrolytic cell of five unit cells each of which was made of polyvinyl chloride except for the electrodes and containing a titanium anode coated with ruthenium oxide and a titanium cathode both disposed horizontally. The results obtained are shown in Table 1 below.

Table 1

| Electrolysis Conditions | | | | | |
|---|---|---|---|---|---|
| Current Density at the Anode: | | | 15 A/dm$^2$ | | |
| Concentration of Aqueous Sodium Chloride Solution Fed: | | | 30 g/liter | | |
| Temperature of Electrolyte Solution: | | | 55° C. | | |
| | Current Density at the Cathode (A/dm$^2$) | | | | |
| | 15* | 23 | 45 | 60 | 75 |
| Ratio of Actual Area of Anode to Actual Area of Cathode | 1.0 | 1.5 | 3.0 | 4.0 | 5.0 |
| Concentration of Available Chlorine Formed (ppm) | 6499 | 6542 | 6696 | 6776 | 6823 |
| Current Efficiency (%) | 63 | 64 | 66 | 69 | 70 |

*Comparison

The results shown in Table 1 demonstrate that good results are obtained when the ratio of the actual area of the anode to the actual area of the cathode is at least about 1.5:1.

EXAMPLE 2

An aqueous solution of sodium chloride was electrolyzed at varying temperatures under the following conditions using a non-diaphragm electrolytic cell of the structure shown in FIG. 8 which was made of polyvinyl chloride except for the electrodes and included a titanium anode coated with ruthenium oxide and a titanium cathode. For comparison, the above procedure was repeated except that the electrolysis temperatures was changed to 60° C. The results obtained are shown in Table 2 below.

Table 2

| Electrolysis Conditions | | | | | | |
|---|---|---|---|---|---|---|
| Current Density at the Anode: | | | 15 A/dm$^2$ | | | |
| Current Density at the Cathode: | | | 30 A/dm$^2$ | | | |
| Concentration of the Sodium Chloride Aqueous Solution Fed: | | | 30 g/liter | | | |
| Concentration of Sodium Hypochlorite Formed: | | | about 7.5 g/liter | | | |
| | Temperature (° C.) | | | | | |
| | 10 | 20 | 30 | 40 | 50 | 60* |
| Current Efficiency (%) | 86.2 | 80.3 | 78.5 | 73.1 | 67.6 | 61.0 |

*For comparison

From the results shown in Table 2, it can be seen that by adjusting the temperature of the electrolyte solution to not more than about 50° C., current efficiencies which are effective for economical operation can be obtained. At a temperature of more than 50° C., for example at 60° C., the current efficiency became about 60%, and electrolysis cannot be performed economically.

While the invention has been described in detail and with reference to specific embodiments thereof, it will be apparent to one skilled in the art that various changes and modifications can be made therein without departing from the spirit and scope thereon.

What is claimed is:

1. A process for producing sodium hypochlorite which comprises electrolyzing an aqueous solution of sodium chloride as an electrolyte solution in a non-diaphragm electrolytic cell comprising at least one unit cell, wherein the ratio of the actual area of the anode to the actual area of the cathode in the electrolytic cell is at least about 1.5:1 or larger, the concentration of the sodium chloride aqueous solution is about 20 g/liter to about 50 g/liter, the effective average current density at the cathode is about 20 A/dm$^2$ to about 80 A/dm$^2$ and the effective average current density at the anode is about 4 to about 60 A/dm$^2$.

2. The process of claim 1, wherein the effective average current density at the cathode is about 20 A/dm$^2$ to about 40 A/dm$^2$ and the effective average current density at the anode is about 10 A/dm$^2$ to about 20 A/dm$^2$.

3. The process of claim 2, wherein the effective average current density at the cathode is 30 A/dm$^2$ and the effective average current density at the anode is 15 A/dm$^2$.

4. The process of claim 1, wherein the process includes cooling the electrolyte solution with at least one cooling means provided in or between the unit cells to maintain the electrolyte solution at a temperature of about 50° C. or less, whereby a sodium hypochlorite solution having an available chlorine concentration of at least about 3 g/liter is obtained.

5. The process of claim 3, wherein the temperature of the electrolyte solution is maintained at 5° to 45° C.

6. The process of claim 4, wherein the electrolyte solution is cooled by passing the electrolyte solution through cooling means provided between the unit cells of the non-diaphragm electrolytic cell comprising a plurality of unit cells.

7. The process of claim 4, wherein the electrolyte solution is cooled by a cooling device provided between the unit cells of the electrolytic cell comprising a plurality of unit cells partitioned by partitioning plates.

8. The process of claim 4, wherein the electrolyte solution is cooled by a cooling device provided along the inside surface of the unit cell.

9. The process of claim 4, wherein the electrolyte solution is cooled by a cooling device associated with the cathode, with cooling water or a cooling gas being introduced into the inside of the cathode.

10. The process of claim 1, wherein the sodium hypochlorite aqueous solution produced has an available chlorine concentration of at least about 3 g/liter.

11. The process of claim 1, wherein the following undesirable side-reactions are inherently inhibited due to the process conditions:

$$HClO + H^+ + 2e \rightarrow HCl + OH^- \tag{1}$$

$$ClO^- + 2H^+ + 2e \rightarrow HCl + OH^- \tag{2}$$

$$(ClO^- + H^+ + 2e \rightarrow Cl^- + OH^-)$$

$$ClO^- + 2HClO \rightarrow ClO_3^- + 2HCl \tag{3}$$

12. The process of claim 1, wherein the sodium hypochlorite aqueous solution produced has an available chlorine concentration of at least about 6 g/liter.

13. The process of claim 1, wherein the aqueous solution of sodium chloride has a pH of about 5 to about 10.

14. The process of claim 1, wherein the formation of sodium chlorate is inhibited.

15. The process of claim 1, wherein the ratio of the actual area of the anode to the actual area of the cathode in the electrolytic cell is 1.5:1 to 3:1.

* * * * *